No. 771,695. PATENTED OCT. 4, 1904.
W. L. BARTON.
CLUTCH MECHANISM.
APPLICATION FILED AUG. 27, 1903.
NO MODEL.

Witnesses
Milton Lenoir
Watts T. Estabrook

Inventor
William L. Barton
by Rhea G. DuBois
his Attorneys

No. 771,695.

Patented October 4, 1904.

UNITED STATES PATENT OFFICE.

WILLIAM L. BARTON, OF CARBONDALE, PENNSYLVANIA.

CLUTCH MECHANISM.

SPECIFICATION forming part of Letters Patent No. 771,695, dated October 4, 1904.

Application filed August 27, 1903. Serial No. 170,991. (No model.)

*To all whom it may concern:*

Be it known that I, WILLIAM L. BARTON, a citizen of the United States of America, residing at Carbondale, Lackawanna county, State of Pennsylvania, have invented certain new and useful Improvements in Clutch Mechanisms, of which the following is a specification.

My invention relates to an improvement in clutch mechanisms; and it consists in certain novel features of construction and arrangements of parts, which will be hereinafter fully described, and pointed out in the claims.

Figure 1:
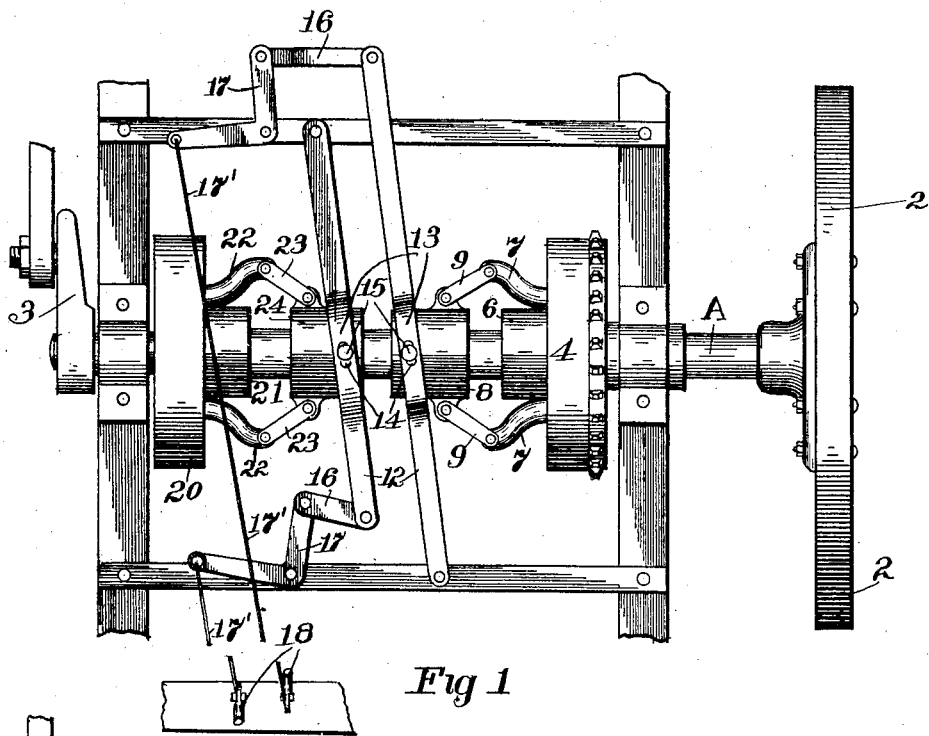
Figure 2:
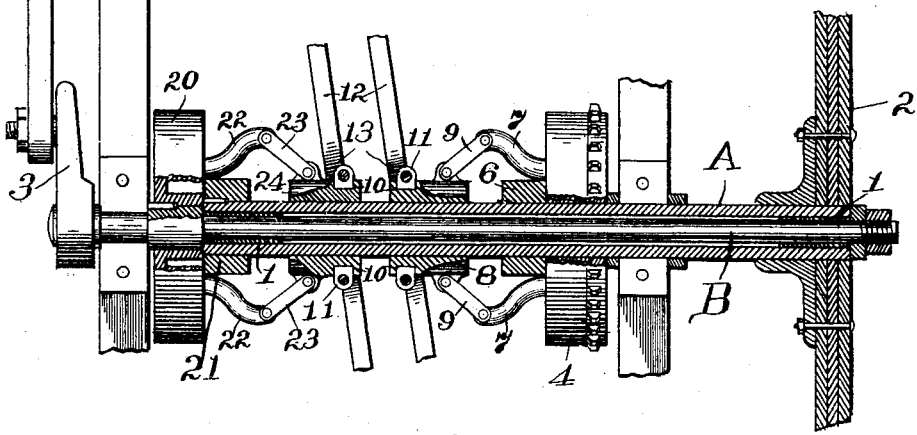

In the accompanying drawings, Figure 1 is a plan view showing the clutches and the lever mechanism for operating the same; and Fig. 2 is a view, partly in section, showing my clutch mechanism in its application to two concentric shafts.

A represents an outer hollow shaft, and B an inner solid shaft, with bushings of brass or other material 1 1 interposed between them. A drive-pulley 2 is secured to the outer hollow shaft as a means by which it is constantly rotated, and bearings are formed at suitable points for the shafts, one preferably for the hollow shaft and the other for the solid, in addition to the bushings referred to. A crank 3 is secured to the outer end of the solid shaft. Of course any other means of communicating its power might be substituted for this crank.

Loosely mounted on the hollow shaft is the drive-wheel 4, which in the present instance takes the form of a sprocket-wheel, although any other transmitting-gear might be used instead. This sprocket-wheel is loosely mounted between the bearing-collar on the hollow shaft and a collar 6, keyed to the hollow shaft, and to this collar the usual clutch-levers 7 7 are pivoted, they being operated by a sliding collar 8, loosely mounted on the hollow shaft through the medium of links 9 9. This sliding collar has a circumferential groove 10 formed therein, and the ring 11 is fitted to the groove. A bar 12 is pivoted at one end upon some convenient support and is provided with a yoke 13, which spans the collar and ring and is provided with slots 14 14 at opposite points, which receive the lugs 15 15 on the ring. This bar is connected by a link 16 to a bell-crank lever 17, which latter is connected, by a rod or other means 17', to a hand-lever 18, by which the clutch is controlled.

A drum 20 is keyed to the solid shaft adjacent to its bearing preferably, and this hollow drum abuts against the adjacent end of the hollow shaft A. A collar 21 is keyed to the hollow shaft adjacent to the drum, and clutch-levers 22 22 are pivoted thereto and operated by means of links 23 23 extending to the sliding collar 24 and operated by the same mechanism, preferably as explained in connection with the sprocket-wheel clutch. Any variety of friction-clutch may be employed for this purpose—as, for instance, the so-called "Jacobson" friction-clutch. I do not, therefore, claim the clutch proper as my invention, as the invention does not consist in the clutch *per se*, but in the combination of a clutch with the other mechanism described.

Having thus fully described my invention, what I claim as new, and desire to secure by Letters Patent of the United States, is—

The combination with a suitable frame, of a plurality of concentrically-located shafts, means for driving one of the shafts, separate clutch members mounted on each shaft, bars pivotally secured at one end to the frame, one bar pivotally secured to one of the clutch members at a point intermediate its length, a link connected to the opposite end of the bar, a bell-crank lever pivotally connected and means connected to the bell-crank lever for operating the same, and a second bar similarly secured and operated, the second bar pivoted to the frame at a point on the opposite side of the concentric shafts, and operating means with which the levers are connected, the means located adjacent each other to permit the clutch members to be conveniently operated.

In testimony whereof I have signed my name to this specification in the presence of two subscribing witnesses.

WILLIAM L. BARTON.

Witnesses:
J. F. REYNOLDS,
JOHN B. SHANNON.